United States Patent
Natarajan et al.

(10) Patent No.: US 10,671,308 B2
(45) Date of Patent: Jun. 2, 2020

(54) PRIVATE AND FAULT-TOLERANT STORAGE OF SEGMENTED DATA

(71) Applicant: International Business Machines Corporation, Armonk, NY (US)

(72) Inventors: Senthilnathan Natarajan, Bangalore (IN); Praveen Jayachandran, Bangalore (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/056,778

(22) Filed: Aug. 7, 2018

(65) Prior Publication Data
US 2020/0050386 A1    Feb. 13, 2020

(51) Int. Cl.
| G06F 16/27 | (2019.01) |
|---|---|
| G06F 21/64 | (2013.01) |
| H04L 9/32 | (2006.01) |
| G06F 3/06 | (2006.01) |
| G06F 21/60 | (2013.01) |

(52) U.S. Cl.
CPC ............ G06F 3/0644 (2013.01); G06F 3/067 (2013.01); G06F 3/0619 (2013.01); G06F 3/0643 (2013.01); G06F 16/27 (2019.01); G06F 21/602 (2013.01); G06F 21/64 (2013.01); H04L 9/321 (2013.01); H04L 2209/38 (2013.01)

(58) Field of Classification Search
CPC . G06F 16/182–1844; G06F 16/27–278; G06F 21/60–645; G06Q 2220/00–18; H04L 9/00–38
See application file for complete search history.

(56) References Cited

U.S. PATENT DOCUMENTS

| 9,881,176 B2 | 1/2018 | Goldfarb et al. |
|---|---|---|
| 2016/0321654 A1 | 11/2016 | Lesavich et al. |
| 2016/0358169 A1 | 12/2016 | Androulaki et al. |
| 2017/0075938 A1* | 3/2017 | Black .................... G06F 21/602 |
| 2017/0278186 A1 | 9/2017 | Creighton et al. |
| 2017/0286717 A1* | 10/2017 | Khi ........................ H04L 63/06 |
| 2019/0104196 A1* | 4/2019 | Li .......................... H04L 9/0861 |
| 2019/0124146 A1* | 4/2019 | Austin ................ H04L 67/1059 |
| 2019/0146946 A1* | 5/2019 | Zhang ................... G06F 16/113 707/667 |
| 2019/0279241 A1* | 9/2019 | DiTomaso .............. G06F 16/27 |

(Continued)

OTHER PUBLICATIONS

A. Ben-Ari, "Outstanding Challenges in Blockchain Technology in 2017," Jan. 25, 2017 [Accessed Mar. 2, 2018]. https://appliedblockchain.com/outstanding-challenges-in-blockchain-2017/.

(Continued)

*Primary Examiner* — Nicholas J Simonetti

(57) ABSTRACT

An example operation may include one or more of receiving a request comprising a file segmented into a plurality of segments corresponding to a plurality of storage nodes, identifying a segment from among the plurality of segments which is designated for the storage node from among remaining segments designated for other storage nodes, storing the identified segment in a local storage of the storage node, hashing the identified segment, and transmitting a response to a client system which includes the hashed identified segment.

20 Claims, 13 Drawing Sheets

(56) References Cited

U.S. PATENT DOCUMENTS

2019/0318063 A1* 10/2019 Wierzba ............... H04L 9/3236

OTHER PUBLICATIONS

Etherium wiki, Github, "Sharding FAQ: On sharding blockchains." [Accessed Mar. 2, 2018].https://github.com/ethereum/wiki/wiki/Sharding-FAQ.
L. Luu, A Secure Sharding Protocol for Open Blockchains. In Proceedings of the 2016 ACM SIGSAC Conference on Computer and Communications Security (CCS '16). ACM, New York, NY, USA, 17-30, 2016.
M. Scherer, "Performance and Scalability of Blockchain Networks and Smart Contracts," Spring 2017, Master of Science Programme in Computing Science and Engineering. Degree Project in Computing Science and Engineering, Umea University, Sweden.

* cited by examiner

Blockchain Transaction Proposal Message

| Tx Type | Version | TS | Channel ID | Tx ID | Epoch | P. Vis. |
|---|---|---|---|---|---|---|
| Chaincode Path (Deploy Tx) | | Chaincode Name (Invoke Tx) | | Chaincode Version | | |
| Tx's Creator Identity (Certificate, public key) - Client | | | | | Signature | |
| Chaincode Type | Input (Chaincode Functions and Args) | | | | Timeout | |

Transient Data Field 410

Segment = <K1, M1, P1>  <K2, Hash(M2), P2> . . . <Kn, Hash(Mn), Pn>
              ⌞411           ⌞412                      ⌞413

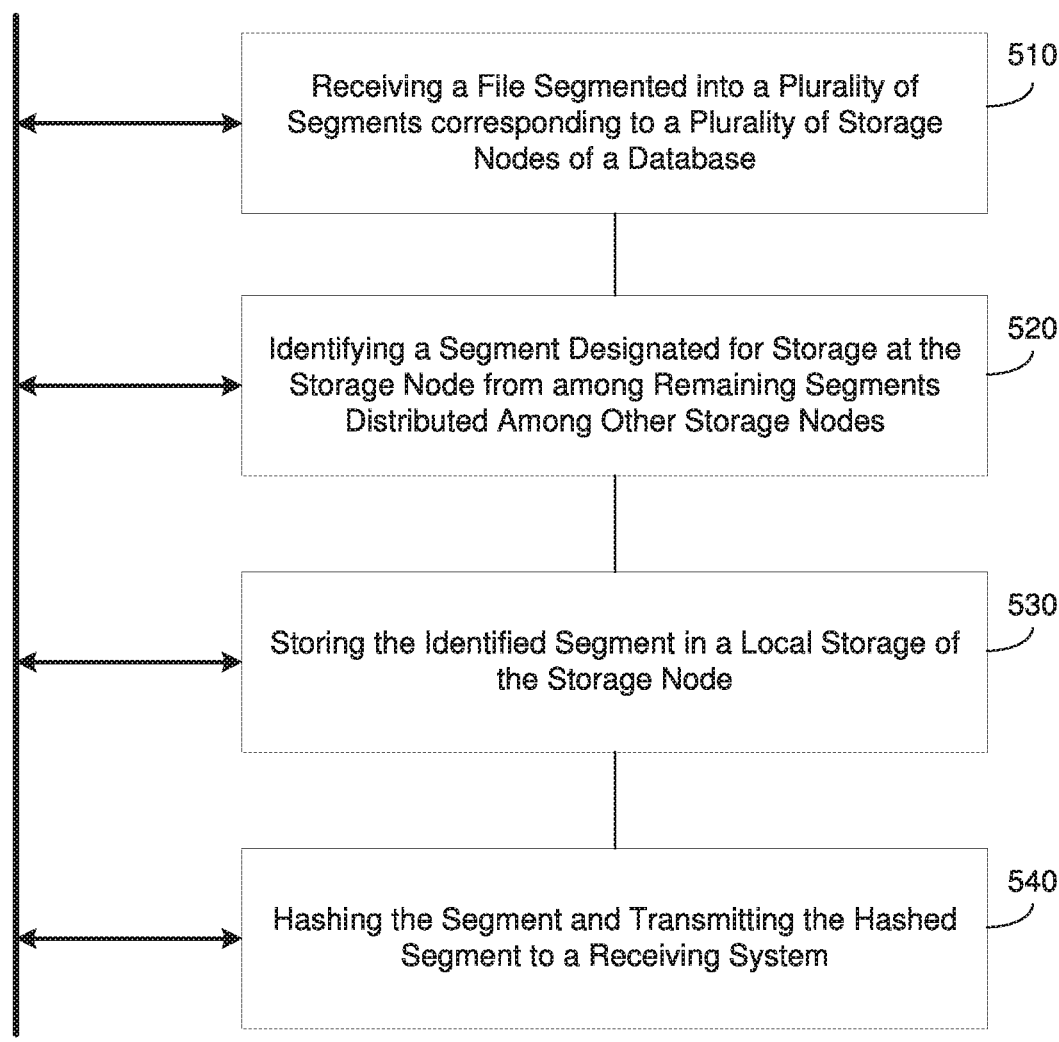

PRIVATE AND FAULT-TOLERANT STORAGE OF SEGMENTED DATA

TECHNICAL FIELD

This application generally relates to a database storage system, and more particularly, to a decentralized database storage system in which a data file is segmented and distributed among a plurality of storage nodes while still maintaining fault-tolerance of the data file.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database is limited by requiring that one central party controls the decisions of the database. However, different parties (especially untrusted parties) are not able to interact with one another in a trusted fashion. As such, what is needed is a solution to overcome these significant drawbacks.

SUMMARY

One example embodiment provides a system that includes one or more of a processor, a network interface, and a storage, wherein the network interface may be configured to receive a request that includes a file segmented into a plurality of segments that correspond to a plurality of storage nodes, and the processor may be configured to identify a segment from among the plurality of segments which is designated for the storage node from among other segments distributed among other storage nodes, store the identified segment in the storage device of the storage node, hash the identified segment, and control the network interface to transmit a response to a client system which includes the hashed identified segment.

Another example embodiment provides a method that includes one or more of receiving a request comprising a file segmented into a plurality of segments corresponding to a plurality of storage nodes, identifying a segment from among the plurality of segments which is designated for the storage node from among remaining segments distributed among other storage nodes, storing the identified segment in a local storage of the storage node, hashing the identified segment, and transmitting a response to a client system which includes the hashed identified segment.

A further example embodiment provides a non-transitory computer readable medium comprising instructions, that when read by a processor, cause the processor to perform a method that may include one or more of receiving a request comprising a file segmented into a plurality of segments corresponding to a plurality of storage nodes, identifying a segment from among the plurality of segments which is designated for the storage node from among remaining segments distributed among other storage nodes, storing the identified segment in a local storage of the storage node, hashing the identified segment, and transmitting a response to a client system which includes the hashed identified segment.

BRIEF DESCRIPTION OF THE DRAWINGS

FIG. 4 illustrates a message for transmitting segmented secret shares of data, according to example embodiments.

FIG. 5 illustrates a method of storing a segment of a distributed segmented data file, according to example embodiments.

DETAILED DESCRIPTION

Figure 1:
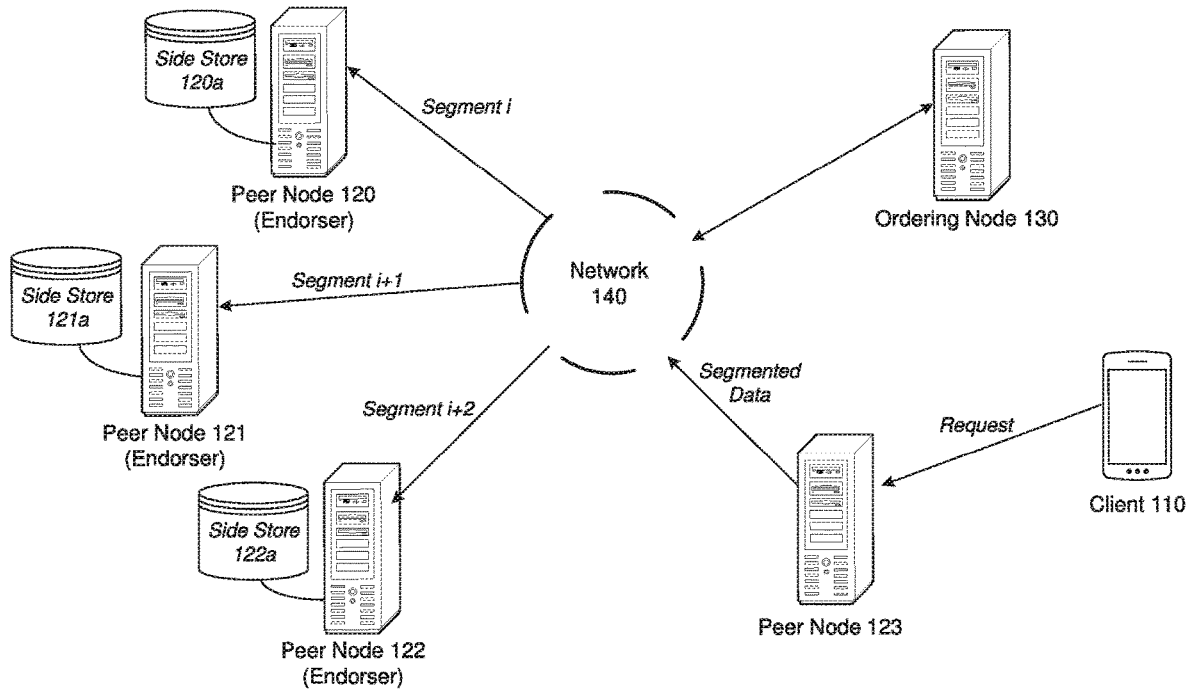
FIG. 1 illustrates a decentralized database storing segmented data in a fault-tolerant scheme, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to a decentralized database system such as a blockchain system in which a file may be broken up and stored in segments rather than as a single large file. The segments may be distributed across different storage nodes of the database such that no storage node has access to all segments while still maintaining the segments in a fault-tolerant manner. Some benefits of the instant solutions described and depicted herein include that data can be held confidentially from even the peer nodes of the blockchain. Accordingly, no single blockchain node will have the entire portion of the data. As a side effect, because each node does not need to store a replicated copy of the entire data but instead stores only its share, significant storage space on the blockchain database is saved.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the confidential distribution of a data file among blockchain nodes is implemented due to a newly defined smart contract and endorsement process which are inherent and unique to blockchain. In particular, a smart contract may split a data file into a plurality of segments, transfer the segmented data file across a plurality of different storage nodes, and perform an endorsement based on the segments.

One of the benefits of the example embodiments is that it improves the functionality of a blockchain by reducing necessary storage space while maintaining fault-tolerant storage. In general, blockchain is not recommended for storing large files because each peer needs to store the complete file. However, the example embodiments provide a blockchain system that can any file such as videos by dividing the large file into multiple segments and storing each segment on a different peer. This also saves storage space on the peers as compared to traditional approach. Other than saving space, it also ensures secrecy and avoid data leaks.

The example embodiments also provide numerous benefits over a traditional database. For example, in a blockchain platform, peers may not trust other peers whereas in a centralized database all entities must trust the central authority. In the blockchain network, a client that belongs to one organization (first peer) may not want to store the confidential data as is on another peer (another organization) as the other peer can leak the secret data without recording a blockchain transaction. The example embodiments ensure that either the peer cannot retrieve the secret data without contacting other peers because no single peer has the complete view of the confidential data or only the client can retrieve the secret data stored on the blockchain network.

The example embodiments also change how data may be stored within a block structure of the blockchain. For example, hashes of a data segment may be stored within a data section of the data block while the actual data of the data segment may be stored in a side store of a blockchain peer. By storing hashes within data blocks of a blockchain an immutable record is created without storing the actual data on the blockchain thus saving significant storage space. Furthermore, the hashes of the segments may be appended to an immutable ledger through a hash-linked chain of blocks. In some embodiments, the data block may be different than a traditional data block by storing hashes of segments of a current block rather than actual data of a current block that is within a traditional block structure of a blockchain. By removing the actual data and instead using a hash of segments, the blockchain can provide the benefit of significant storage space reduction.

FIG. 1 illustrates a decentralized database system 100 storing segmented data in a fault-tolerant scheme, according to example embodiments. In this example, the decentralized database system 100 is a blockchain, however, embodiments are not limited thereto. Referring to FIG. 1, the system 100 includes a plurality of peer nodes 120-123 (also referred to as storage nodes) and an ordering node 130 which are connected to each other via a network 140. Here, the network 140 may be a private network, the Internet, etc. In the example of FIG. 1, a client 110 submits a transaction including a data file for storage on the blockchain. In this example, each of the peer nodes 120-123 store a replica of the blockchain. For purposes of example only, peer nodes 120, 121, and 122 are endorsing peers for the transaction including storage of the data file from the client 110. The endorsing peers may be defined via an endorsement policy between the nodes of the system 100.

According to various embodiments, the peer node 123 may receive the request from the client 110 including a data file to be stored. Here, the peer node 123 may also be referred to as a client node. In this example, the client node 123 may encode the data file using an (n,q) linear code or similar coding technique which divides the data into 'n' segments and having any 'q' out of 'n' segments is sufficient to reconstruct the data, where q may be less than or equal to n. The client node 123 may distribute one different segment (without being hashed) to each of 'n' blockchain nodes which in this example is three blockchain nodes 120, 121, and 122. Here, each of the blockchain nodes 120, 121, and 122 may store its respective data segment in a side store 120a, 121a, and 122a maintained by the blockchain node 120, 121, and 122, respectively. The blockchain nodes 120, 121, and 122 are the nodes authorized to store the data.

According to various embodiments, the client node 123 may split the data file into 'n' segments where each segment includes a format of: <key, segment-message, peerID>. In this example, the segments may be $K_1$, $M_1$, $P_1$>, <$K_2$, $M_2$, $P_2$> and <$K_n$, $M_n$, $P_n$>. Here, P1 may be blockchain node 120, P2 may be blockchain node 121, and Pn may be blockchain node 122. However, rather than transmit each segment such that it is readable by each peer node, the client node 123 may generate a hash of segments that are not to be stored by a particular node, while leaving a segment that is to be stored by the node as is. For example, if the blockchain node 120 is to store segment M1, then the client node 123 may generate a hash M2, and Mn, while leaving M1 as is when transmitting the segments to the blockchain node 120. Likewise, the client node 123 may do the same thing for segment M2 for blockchain node 121 and segment Mn for blockchain node 122.

In response, each blockchain node 120-122 may store the respective segment in its corresponding side store which is local to the blockchain node and off-chain from the blockchain (hash-linked chain of blocks) replicated among the blockchain nodes 120-123. For example, blockchain node 120 may store segment M1 in its side store 120a, blockchain node 121 may store segment M2 in its side store 121a, and blockchain node 122 may store segment Mn in its side store 122a. Furthermore, each blockchain node 120-122 may hash the segment stored locally and transmit the hashed segment along in a response with the other hashed segments and a signature to the client node 123 for purposes of endorsement. If successfully hashed, each blockchain node 120-122 should submit the same response to the client node 123 where all three segments are hashed including a hash(M1), hash(M2), and hash(Mn). The client node 123 may submit the responses to an ordering node 130. In response, the ordering node 130 may order the hashed segments for storage in a block and transmit a request to commit the hashed segments to the blockchain. Accordingly, each of the blockchain nodes 120-123 may commit the hashed segments to the blockchain which is replicated among the blockchain nodes 120-123.

According to various embodiments, chaincode of each blockchain node (e.g., blockchain nodes 120-122) may write all data given in the transient field which is confidential including the hashes of segments stored by other nodes into a state database except the segment message $M_i$ (which is intended for this peer). Instead, the actual segment message is stored in a side store, then hashed, and only the hash($M_i$) is stored in the state database by the peer. In some cases, the chaincode may require a new application programming interface (API) from the fabric to fetch an ID of a peer on which the chaincode is executing. Therefore, the actual message data including the segmented file data is distributed among the side stores (e.g., 120a-122a) while each blockchain node stores a special write set including hashes of each of the segments rather than exposing the actual data. This avoids storing secret data in the Block. For example, the special write set may be $<K_1, hash(M_1), P_1>, <K_2, hash(M_2), P_2> \ldots <K_n, hash(M_n), P_n>$.

According to various embodiments, the client node 123 may transmit the segment data to each node through a new data field of a blockchain message referred to as a transient data field. The transient data field may be included in a blockchain transaction proposal to pass secret data segment to each respective peers. This ensure that the blockchain fabric will drop this data in the transaction proposal response and hence the secret data will not be stored in a block on the blockchain.

Accordingly, only a hash of each segment is stored as part of the transaction in a block on the blockchain rather than the actual data of each segment. Furthermore, fault-tolerance is achieved because any 'q' peers that are non-malicious are sufficient to reconstruct the data. Furthermore, the system is private in that data is not replicated across all nodes in the network, but only amongst authorized nodes which only stores segments instead of an entire file. Furthermore, a storage volume required is (n/q*data size) and not p*data size, where p is the number of peers in the blockchain network. In addition, immutability is achieved as the hash of each segment is on blockchain and the hash of each segment is validated by at least one peer on blockchain. Furthermore, it is possible to ensure that no peer has access to the full secret data, but only sees one encoded segment (artist sharing digital media with only authorized buyers without depending on a trusted distributor; blockchain acts as a decentralized distributor).

Figure 2A:
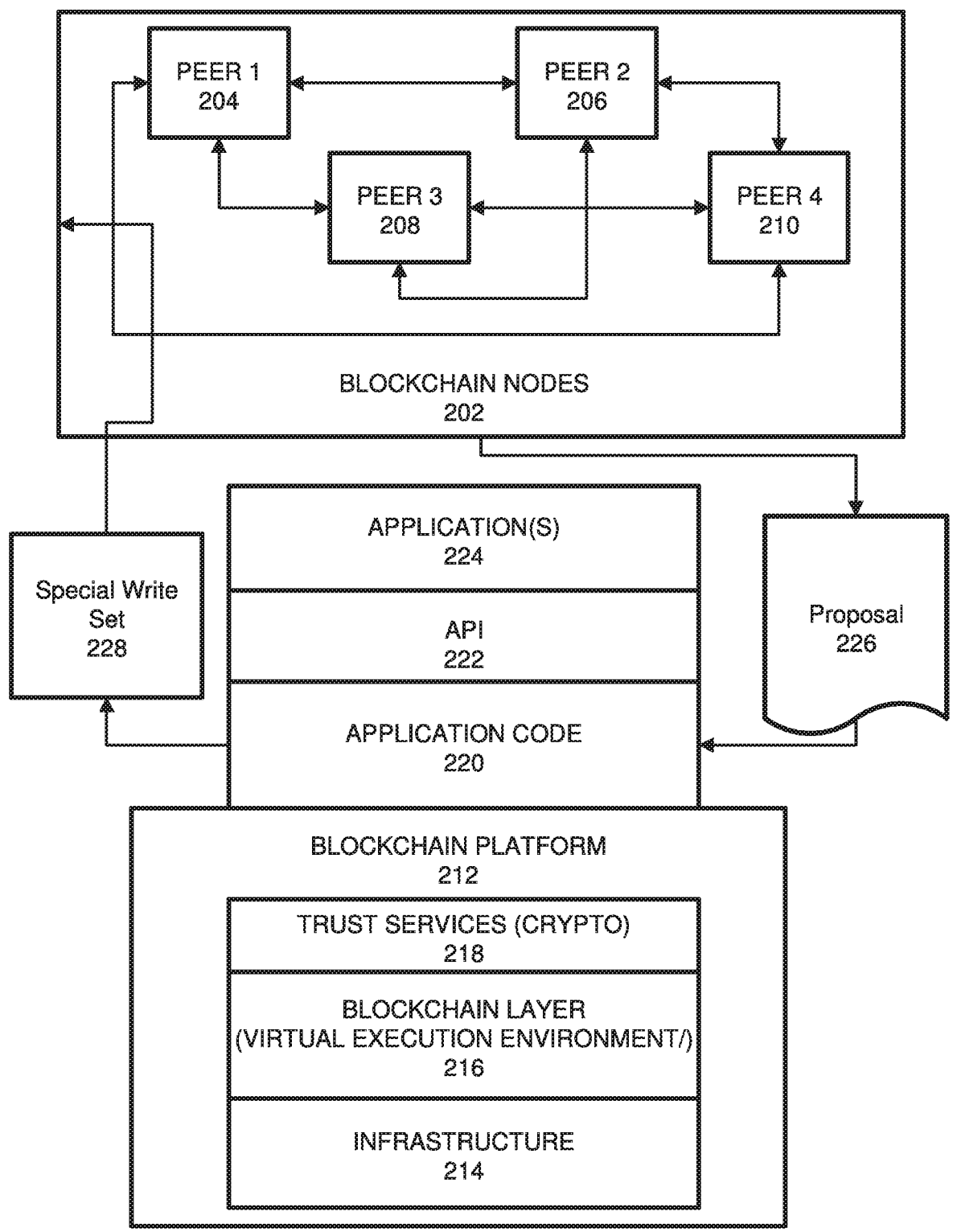
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, transaction proposal 226 may include data segments of a larger file which may be processed by one or more processing entities (e.g., virtual machines) included in the blockchain layer 216. In some cases, one of the segments may not be hashed but may be the actual segment. In this case, the application (chaincode) may store the segment in a side store (not shown), and hash the segment to generate a special write set including a hash of all segments. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols. In some embodiments, rather than store the actual data of a transaction, a smart contract may store a special write set which includes only hashes of segments of the transaction.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the chaincode function may take a transaction proposal 226 (identifying shares or segments) of a larger file as input. The segments will be different for each endorser and the client selectively sends different segments to different peers. For all other segments, only a hash is sent to the peer. For instance, peer 1 will get share 1 and the hash of all other n−1 shares. Peer 2 will get share 2 and the hash of all others, and so on. The function stores the secret segment in a side database. It will compute the hash of this secret segment, and along with the remaining n−1 hashes it received, write it into blockchain state. Every peer computes the hash of the secret segment it received, but writes all n hashes to blockchain. All peers thus write the same data (the n hashes) as part of the blockchain transaction.

Figure 2B:
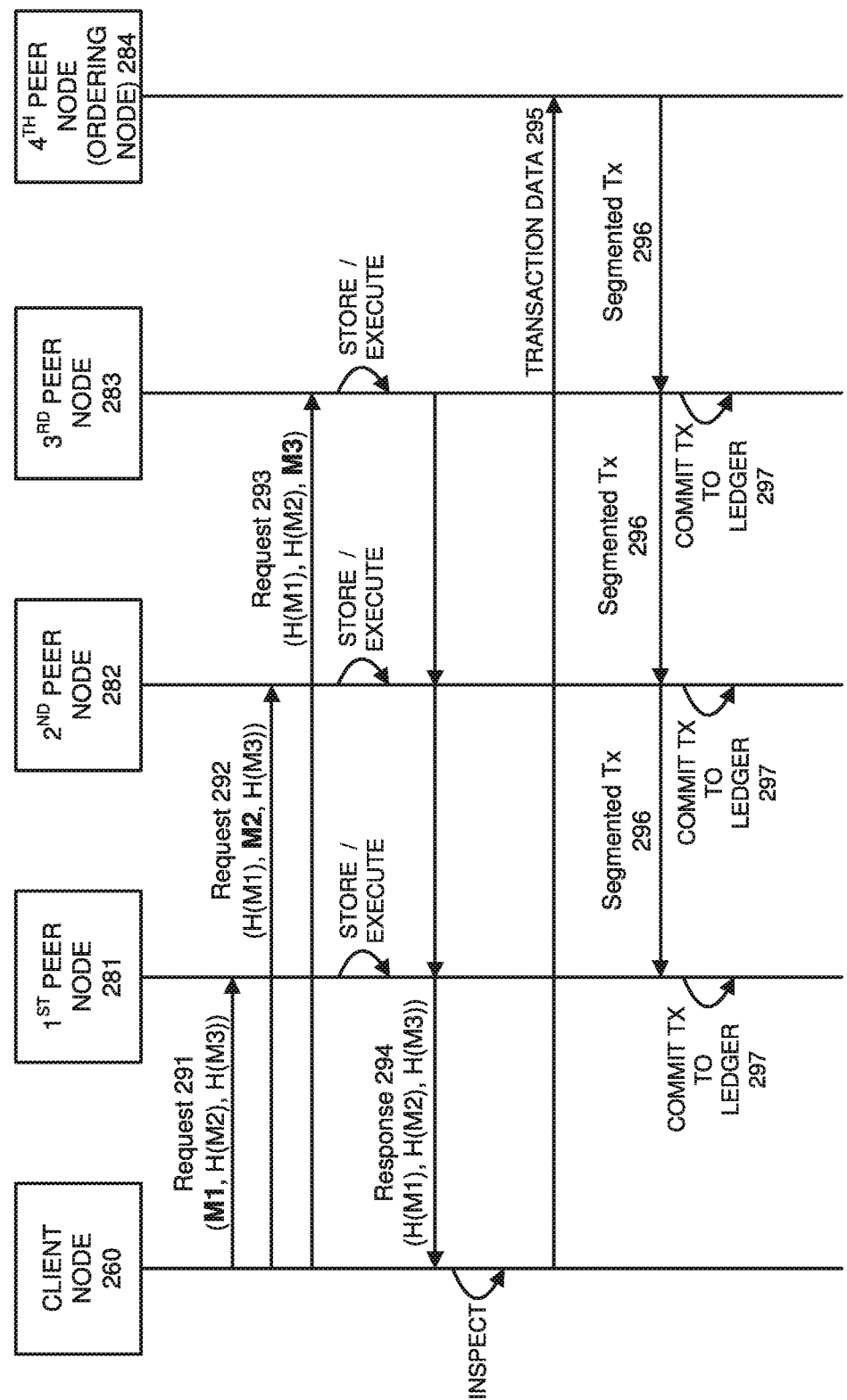
FIG. 2B illustrates a transactional flow among nodes of a decentralized database, according to example embodiments.

FIG. 2B illustrates an example of a transactional flow 250 between nodes of the blockchain in accordance with an example embodiment. Referring to FIG. 2B, the transaction flow may include a transaction proposal sent by an application client node 260 to three endorsing peer nodes 281, 282, and 283. In this example, each endorsing peer receives a similar transaction proposal which identifies three segments of a larger file that is broken up by the client node 260. However, instead of transmitting each segment to each peer node, a peer is only provided with one segment and hashes of the remaining segments. In particular, transaction 291 is sent to peer node 281 and includes an actual data segment $M_1$, with hashes of remaining data segments $M_2$ and $M_n$. Meanwhile, transaction 292 is sent to peer node 282 and includes an actual data segment of $M_2$ and hashes of remaining data segments $M_1$ and $M_n$. Furthermore, transaction 293 is sent to peer node 283 and includes an actual data segment $M_n$, and hashes of segments $M_1$ and $M_2$.

In response, each peer stores its corresponding segment in a side store, hashes its segment, and transmits a response 294 including hashes of all segments $M_1$, $M_2$, and $M_n$ regardless of the peer node. The responses 294 act as an endorsement of the segmented data transaction proposal. Here, the peer nodes 281, 282, and 283 will endorse the segment if it is successfully simulated by the chaincode. For example, each endorsing peer node 281, 282, and 283 may verify the client signature and execute a chaincode function to initiate the transaction. The output may include the chaincode results, a set of key/value versions that were read in the chaincode (read set), and the set of keys/values that were written in chaincode (write set). The proposal response 294 is sent back to the client 260 along with an endorsement signature, if approved. The client 260 assembles the endorsements into a transaction payload 295 and broadcasts it to an ordering service node 284. The ordering service node 284 then delivers ordered transactions 296 as blocks to all peers 281-283 on a channel. Before committal to the blockchain, each peer 281-283 may validate the transaction 296 which includes the hashes of the three segments M1, M2, and Mn. Here, the peers 281-283 may check the endorsement policy to ensure that the correct allotment of the specified peers have signed the results and authenticated the signatures against the transaction payload 293. When the check is successful, the peers 281-283 are committed in 297 to a distributed ledger stored by each peer 281-283.

The client 260 may include an application leveraging a supported software development kit (SDK), such as NODE, JAVA, PYTHON, and the like, which utilizes an available API to generate a transaction proposal including the segmented data file having the segments M1, M2, . . . Mn. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, each endorsing peer node 281-283 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. Furthermore, each peer node may extract a share/segment associated with the peer node and store the respective share/segment in a side store. The chaincode is then executed against a current state database to produce transaction results including a response value, read set, and a special write set which includes hashes of all segments. However, no updates are made to the ledger at this point. In 294, the set of values, along with the endorsing peer node signatures are passed back as a proposal response 294 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client 260 may include only one of multiple parties to the transaction. In this case, each client may have their own group of storage nodes for storing the segmented data, and each endorsing/storage node will need to endorse the transaction. The architecture is such that even if an application selects not to inspect responses or otherwise forwards an unendorsed transaction, the endorsement policy will still be enforced by peers and upheld at the commit validation phase.

After successful inspection, the client 260 assembles endorsements into a transaction payload 295 and broadcasts the transaction proposal and response within the transaction payload 295 to the ordering node 284. The transaction payload 295 may contain the read set, special write set, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions within the block are validated to ensure any endorsement policy is fulfilled and to ensure that there have been no changes to ledger state for read set variables since the read set was generated by the transaction execution. Transactions in the block are tagged as being valid or invalid. Furthermore, in step 297 each peer node 281-283 appends the block to the channel's chain, and for each valid transaction the special write sets (hashed segments) are committed to current state database. An event is emitted, to notify the client application that the transaction (invocation) has been immutably appended to the chain, as well as to notify whether the transaction was validated or invalidated.

Figure 3:
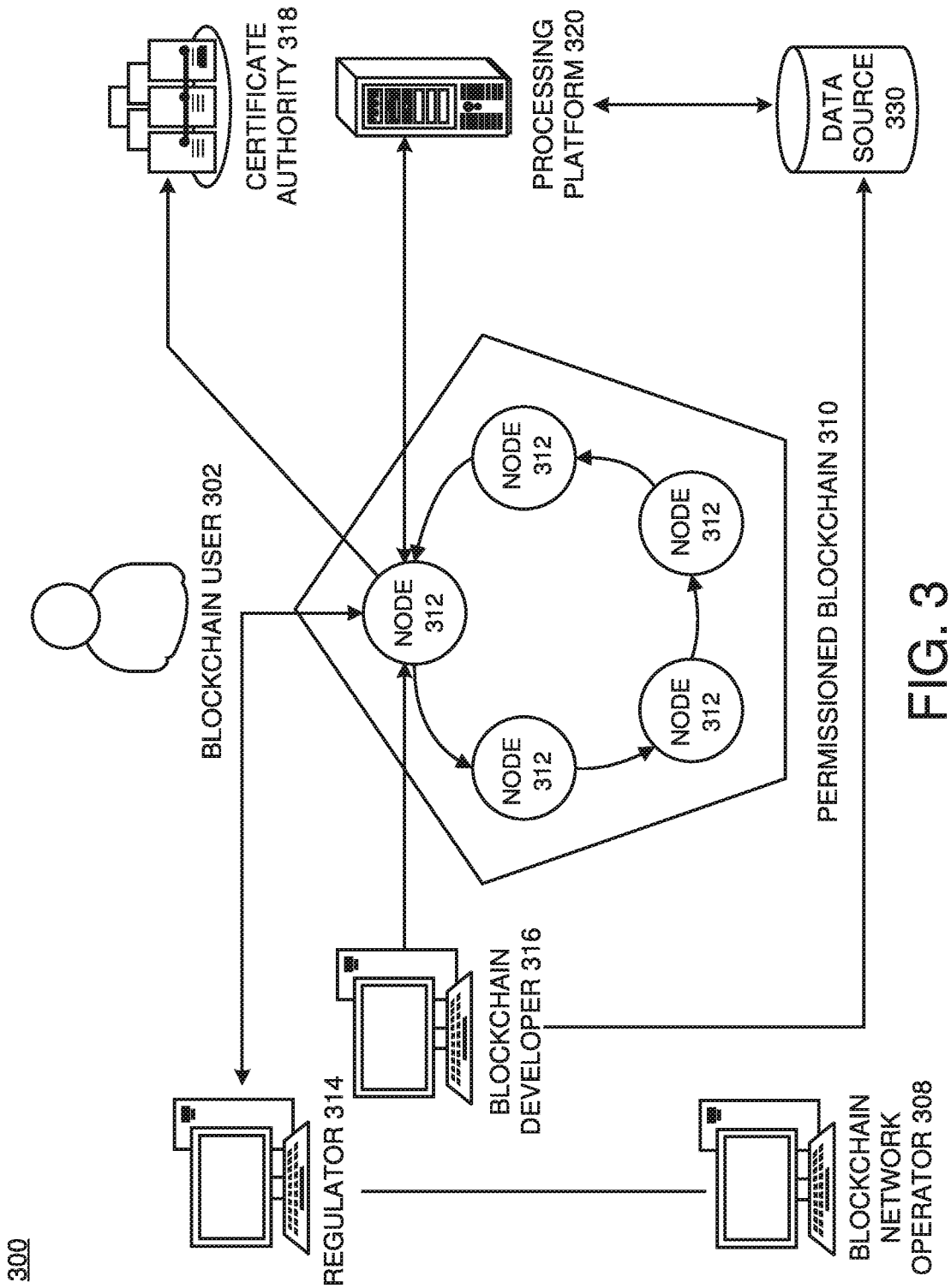
FIG. 3 illustrates an example of a permissioned blockchain system, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIG. 4 illustrates a message 400 for transmitting segmented secret shares of data, according to example embodiments. For example, the message 400 may be a blockchain transaction proposal message, however, embodiments are not limited thereto. In this example, the message 400 may include message fields/components in a related art such as a transaction type, a version, a timestamp, a channel ID corresponding to the blockchain, a chaincode network path, a chaincode name and version, an identity of a client that created the transaction request, a signature of the client node, and the like.

According to various embodiments, the message 400 may also include a new data field (e.g., transient data field 410) for carrying the segmented data information. For example, the segmented data information may include an identification of a plurality of segments of a larger file which are broken up by the client. However, instead of inserting each segment into the message, only a data segment intended for storage by the respective node receiving the message 400 may be included while hashes of the other segments that are distributed to other peer nodes may be included in the message 400. In the example of FIG. 4, the message 400 is intended for a first peer (P1) which is to store segment M1 411. In this case, the transient data field 410 includes an actual data segment 411 for M1, a hash 412 of the second data segment M2 and a hash 413 for the third data segment M3. In addition, the transient data field 410 may also include respective keys and peer identifiers associated with each segment.

When the blockchain peer receives the message 400, the blockchain peer may extract the actual data segment 411 of the first segment M1 from the transient data field 410 and store the actual data segment 411 for M1 in a side storage (local storage) associated with the blockchain peer. Furthermore, the blockchain peer may simulate a transaction associated with M1, hash M1, and transmit a transaction response to the client node including the generated hash of M1, as well as the previously received hashes of M2 and M3.

FIG. 5 illustrates a method 500 of storing a segment of a distributed segmented data file, according to example embodiments. For example, the method 500 may be performed by a storage node such as a blockchain peer node. Referring to FIG. 5, in 510, the method may include receiving a request that may include a file segmented into a plurality of segments corresponding to a plurality of storage nodes. For example, the request may include the message 400 shown in FIG. 4 such as a blockchain transaction proposal, however, embodiments are not limited thereto. As another example, the request may not be a blockchain message but may be another type of decentralized database message.

In 520, the method may include identifying a segment from among the plurality of segments which is designated for the storage node from among remaining segments distributed among other storage nodes. Here, one (or more) of the segments may be actual segments while the remaining segments are hashes of segments. The method may identify the actual segment based on a blockchain peer ID included in the request and associated with the blockchain peer node performing the method. In some embodiments, the plurality of segments are received via a transient field of a blockchain proposal message which may be cut when generate a data block for storage on the blockchain. In some embodiments, the plurality of segments may include n segments, where q of the n segments can be used to recover the entire file, and q is less than n.

In 530, the method may include storing the identified segment in a local storage of the storage node such as a side store. Furthermore, in 540 the method may include hashing the identified segment, and in 550, transmitting a response to the client which includes the hashed identified segment and hashes of remaining segments initially received. In some embodiments, the method may further include committing the hashed identified segment and hashed remaining segments among the plurality of segments to a data block within a hash-linked chain of data blocks. Here, the committing may be performed in response to receiving a request from an orderer node. In some embodiments, the transmitting the response may include transmitting an endorsement of the storage node to a client system that submitted the request.

Figure 6A:
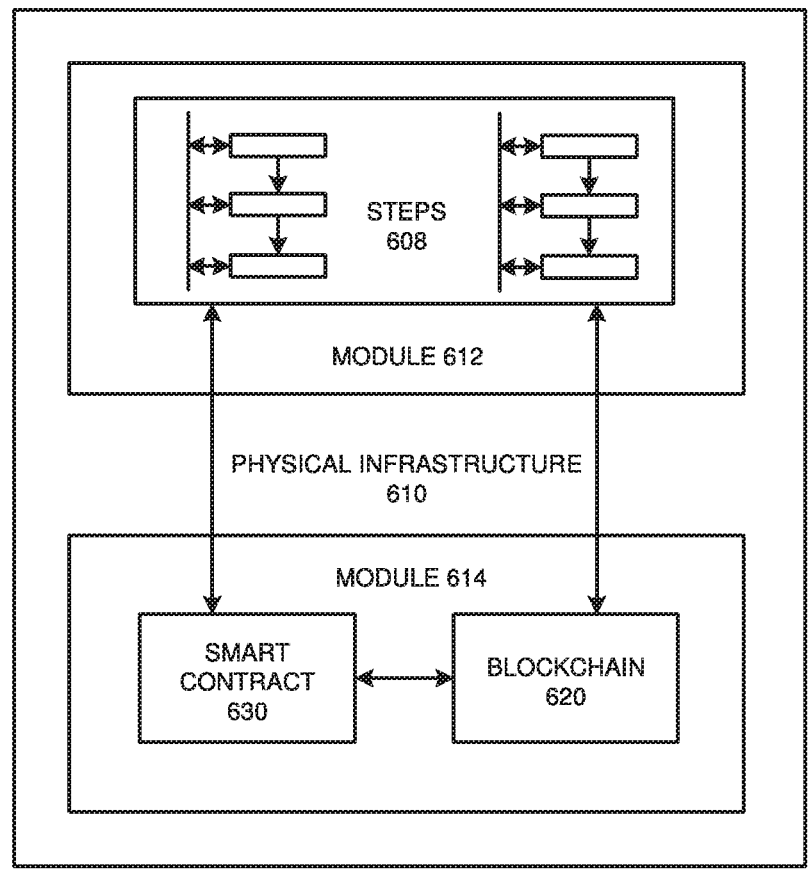
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
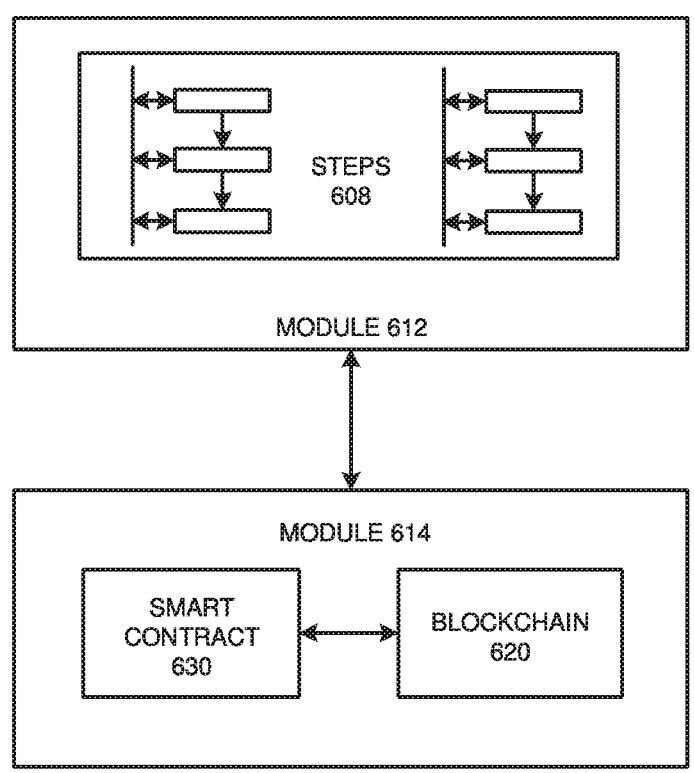
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. For example, the smart contract 630 may generate a special write set with hashed segments of a larger file rather than storing actual data of the file on the blockchain. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
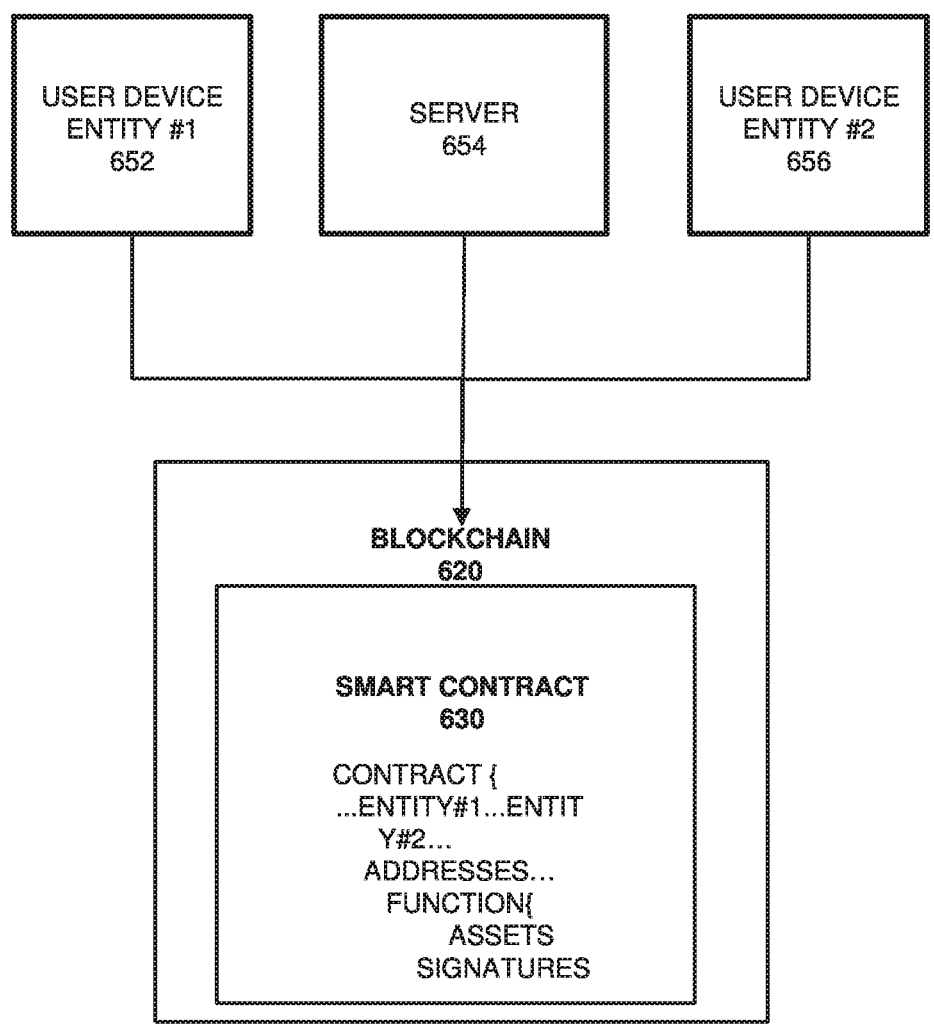
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction and may include a special write set in which hashes of segments of a larger file are stored instead of actual data of the file. The smart contract 630 resides on the blockchain 620 which may reside on one or more computers, servers, processors, memories, and/or wireless communication devices.

Figure 6D:
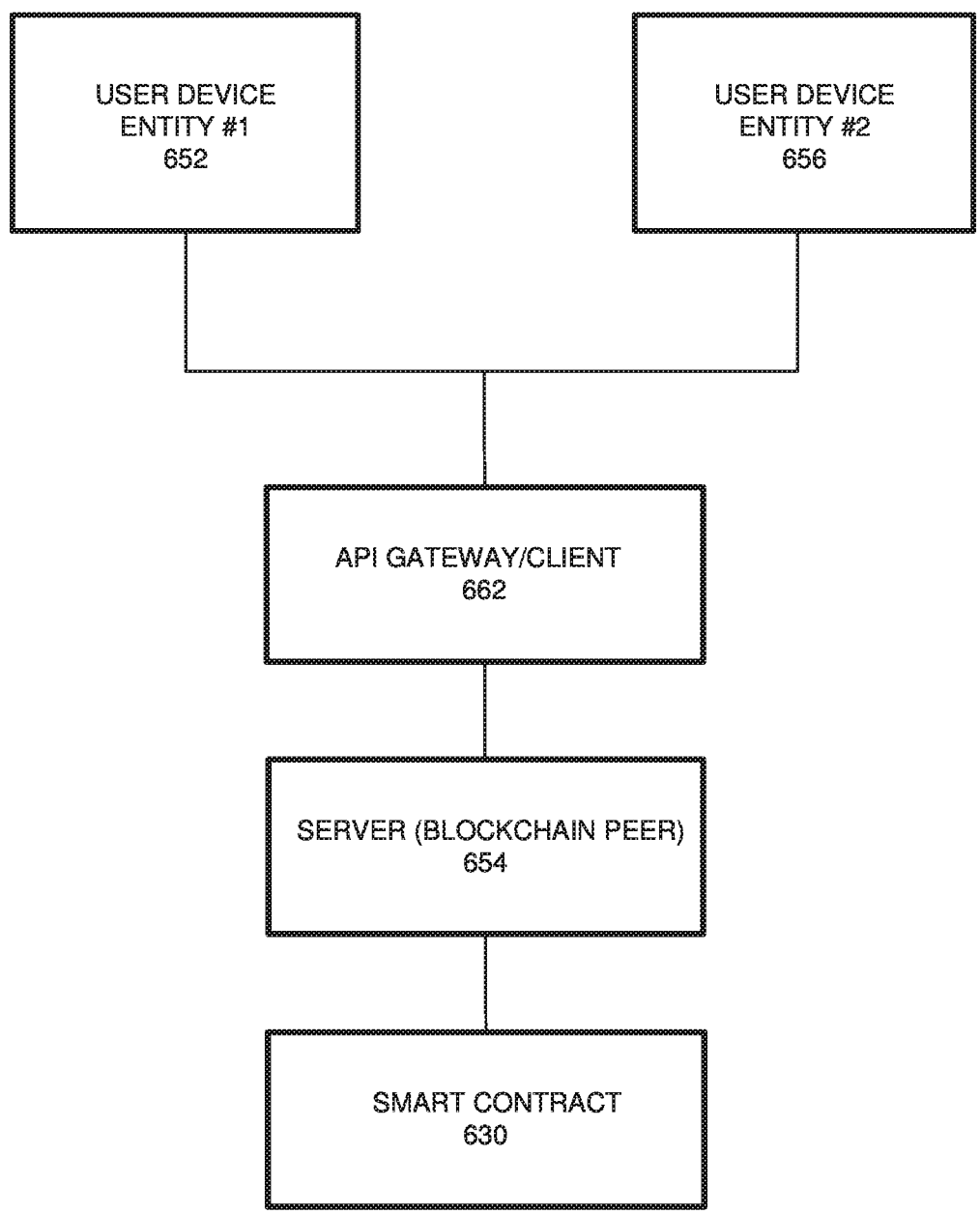
FIG. 6D illustrates a common interface for accessing logic and data of a database, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

Figure 7A:
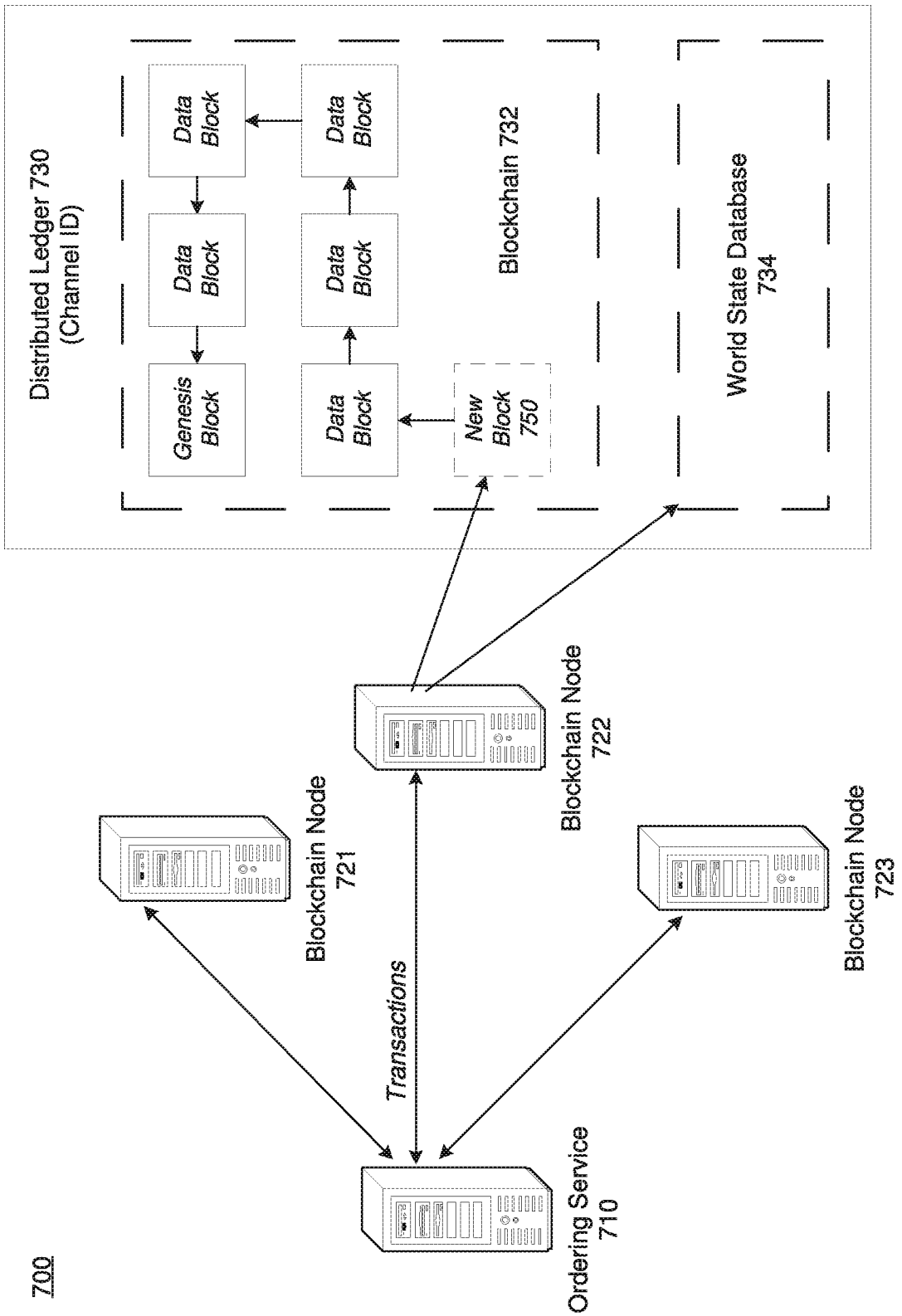
FIG. 7A illustrates a process of new data being added to a database, according to example embodiments.
Figure 7B:
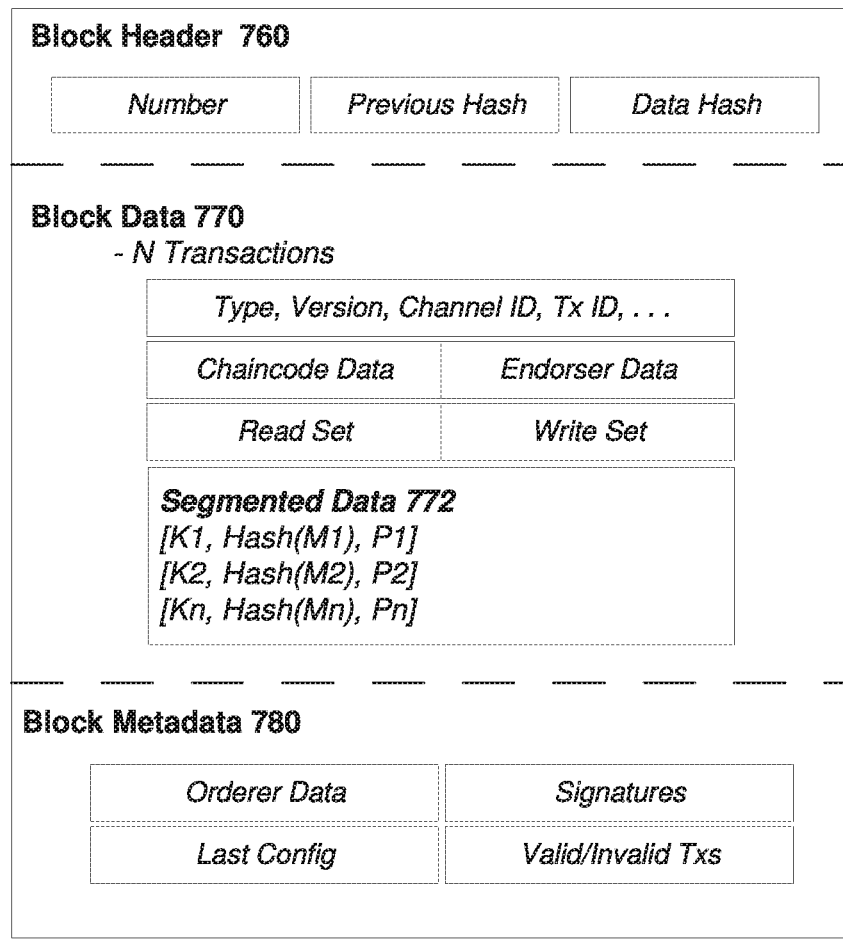
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the special write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the special write data from the read-write set. If a transaction fails, that is, if the committing peer finds that the read-special write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store segmented data 772 which includes hashes of segments of a larger file broken up by a client, and adds the segmented data 772 to the hash-linked chain of blocks in the blockchain 732. Accordingly, the segmented data 772 can be stored in an immutable log of blocks on the distributed ledger 730 without revealing the actual underlying data hidden by the hashes. Some of the benefits of storing such data 772 are reflected in the various embodiments disclosed and depicted herein and include confidentiality of data, a reduction in storage space, and the like.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
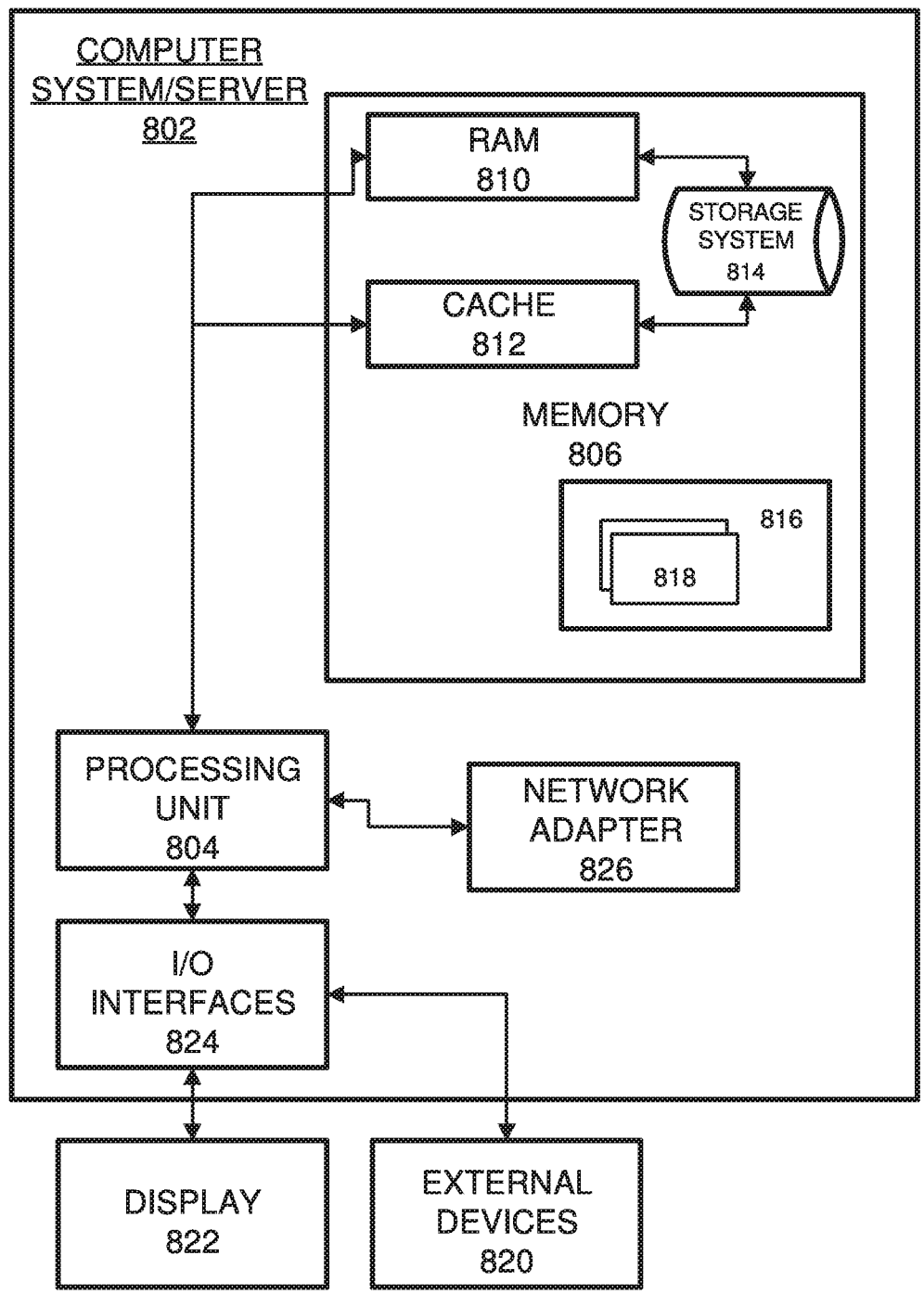
FIG. 8 illustrates an example computing system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to:

microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A storage node, comprising:
    a storage device;
    a network interface configured to receive a request that includes data of a plurality of segments that correspond to a plurality of storage nodes, respectively, where the request includes a segment designated for the storage node and hashes of remaining segments designated for other storage nodes; and
    a processor configured to store the designated segment in the storage device of the storage node, hash the designated segment, and control the network interface to transmit an endorsement response which includes the hashed designated segment and the hashes of the remaining segments to a computing system associated with the request.

2. The storage node of claim 1, wherein the plurality of segments are received via a transient field of a blockchain proposal message.

3. The storage node of claim 1, wherein the plurality of segments comprise n segments corresponding to n storage nodes, q of the n segments can be used to recover the entire file, and q is less than n.

4. The storage node of claim 1, wherein the designated segment is labeled with an identifier of the storage node while the hashes of the remaining segments are labeled with respective identifiers of the other storage nodes.

5. The storage node of claim 1, wherein the processor is further configured to commit the hashed designated segment and the hashes of the remaining segments to a data block within a hash-linked chain of data blocks.

6. The storage node of claim 5, wherein the processor commits the hashed designated segment in response to receipt of a request from an orderer node.

7. The storage node of claim 1, wherein the processor simulates the designated segment and controls the network interface to transmit an endorsement of the storage node based on the simulation of the designated segment to a client system that submitted the request.

8. A method of a storage node, comprising:
receiving a request comprising data of a plurality of segments corresponding to a plurality of storage nodes, respectively, where the request includes a segment designated for the storage node and hashes of remaining segments designated for other storage nodes;
storing the designated segment in a local storage of the storage node;
hashing the designated segment; and
transmitting an endorsement response which includes the hashed designated segment and hashes of the remaining segments to a computing system associated with the request.

9. The method of claim 8, wherein the plurality of segments are received via a transient field of a blockchain proposal message.

10. The method of claim 8, wherein the plurality of segments comprise n segments corresponding to n storage nodes, q of the n segments can be used to recover the entire file, and q is less than n.

11. The method of claim 8, wherein the designated segment is labeled with an identifier of the storage node while the hashes of the remaining segments are labeled with respective identifiers of the other storage nodes.

12. The method of claim 8, further comprising committing the hashed designated segment and the hashes of the remaining segments to a data block within a hash-linked chain of data blocks.

13. The method of claim 12, wherein the committing is performed in response to receiving a request from an orderer node.

14. The method of claim 8, wherein the transmitting the endorsement response comprises simulating the designated segment and transmitting an endorsement of the storage node based on the simulation of the designated segment to a client system that submitted the request.

15. A non-transitory computer readable medium comprising program instructions that when executed cause a computer to perform a method comprising:
receiving a request comprising data of a plurality of segments corresponding to a plurality of storage nodes, respectively, where the request includes a segment designated for the storage node and hashes of remaining segments designated for other storage nodes;
storing the designated segment in a local storage of the storage node;
hashing the designated segment; and
transmitting an endorsement response which includes the hashed designated segment and the hashes of the remaining segments to a computing system associated with the request.

16. The non-transitory computer readable medium of claim 15, wherein the plurality of segments are received via a transient field of a blockchain proposal message.

17. The non-transitory computer readable medium of claim 15, wherein the plurality of segments comprise n segments corresponding to n storage nodes, q of the n segments can be used to recover the entire file, and q is less than n.

18. The non-transitory computer readable medium of claim 15, wherein the designated segment is labeled with an identifier of the storage node while the hashes of the remaining segments are labeled with respective identifiers of the other storage nodes.

19. The non-transitory computer readable medium of claim 15, wherein the method further comprises committing the hashed designated segment and the hashes of the remaining segments to a data block within a hash-linked chain of data blocks.

20. The non-transitory computer readable medium of claim 15, wherein the transmitting the endorsement response comprises simulating the designated segment and transmitting an endorsement of the storage node based on the simulation of the designated segment to a client system that submitted the request.

* * * * *